United States Patent
Castelain (10) Patent No.: US 11,240,086 B2
(45) Date of Patent: Feb. 1, 2022

(54) METHOD, DEVICE AND STORAGE MEDIUM FOR TRANSFERRING, BY EMITTER, FLOW OF SAMPLES TO RECEIVER BY EMITTER

(71) Applicant: MITSUBISHI ELECTRIC CORPORATION, Tokyo (JP)

(72) Inventor: Damien Castelain, Rennes (FR)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 17/259,331

(22) PCT Filed: Sep. 6, 2019

(86) PCT No.: PCT/JP2019/035996
§ 371 (c)(1),
(2) Date: Jan. 11, 2021

(87) PCT Pub. No.: WO2020/054826
PCT Pub. Date: Mar. 19, 2020

(65) Prior Publication Data
US 2021/0306196 A1    Sep. 30, 2021

(30) Foreign Application Priority Data

Sep. 10, 2018 (EP) ...................... 8193497

(51) Int. Cl.
*H04L 27/26* (2006.01)
*H04L 25/03* (2006.01)

(52) U.S. Cl.
CPC .... *H04L 27/2636* (2013.01); *H04L 25/03159* (2013.01)

(58) Field of Classification Search
CPC .................................................. H04L 27/2636
USPC .......................................................... 375/295
See application file for complete search history.

(56) References Cited

PUBLICATIONS

Tanabe et al., "A Novel Dynamic Channel Access Scheme Using Overlap FFT Filter-Bank for Cognitive Radio", IEICE Transactions on Communications, vol. E92B, No. 12, Dec. 1, 2009, pp. 3589-3596.

Yli-Kaakinen et al., "Optimization of Flexible Filter Banks Based on Fast Convolution", Journal of Signal Processing Systems, vol. 85, No. 1, May 22, 2015, pp. 101-111.

*Primary Examiner* — Lihong Yu
(74) *Attorney, Agent, or Firm* — Birch, Stewart, Kolasch & Birch, LLP (57) ABSTRACT

The present invention concerns a method and device for transferring, by an emitter, a flow of samples to a receiver through a wireless interface using Single-Carrier Frequency Division Multiple Access. The emitter: —selects consecutive blocks of M samples of the flow of samples, —modulates each selected block, —selects, for each modulated block, half of the modulated block located in the center of the modulated block, —selects, with a M/2 sample shift, consecutive blocks of M samples, —modulates each selected block with the shift, —selects, for each modulated block with the shift, half of the modulated block with the shift located in the center of the modulated block with the shift, —forms a stream composed of one in two half ordered modulated blocks and, between two half ordered modulated blocks, one half ordered modulated block with the shift, —transfers the formed stream.

11 Claims, 6 Drawing Sheets

METHOD, DEVICE AND STORAGE MEDIUM FOR TRANSFERRING, BY EMITTER, FLOW OF SAMPLES TO RECEIVER BY EMITTER

TECHNICAL FIELD

The invention concerns a method and device for transferring, by an emitter, a flow of samples to a receiver through a wireless interface using Single-Carrier Frequency Division Multiple Access.

BACKGROUND ART

SC-OFDM is a modulation scheme with OFDM-type multiplexing but single-carrier-like envelope. It can be implemented either in the time-domain (IFDMA) or in the frequency-domain. In the last case, it is also called DFT-spread OFDM, or SC-FDE (Single Carrier Frequency Domain Equalization) or SC-FDMA (Single Carrier Frequency Division Multiple Access). The frequency domain implementation is generally preferred, especially in the receiver.

The main advantage with respect to OFDM is that the DFT preceding restores the SC nature of the signal, i.e. a low (SC-like) Peak-to-Average Power Ratio (PAPR). The channel equalizer is easily implemented in the frequency domain, thanks to the cyclic prefix insertion.

A particular point is the loss in spectral efficiency due to the cyclic prefix. If we want to get rid of the cyclic prefix (CP), one has to implement, at the receiver side, an equalizer which is not restricted to one particular block. One such possibility is overlap-save equalization.

Overlap-save equalization is a way to implement equalization in the frequency domain, when no cyclic prefix exists. Implementing equalization in the frequency domain has two advantages, generally it decreases the complexity, i.e. the total number of operations and it is compatible with a zero-roll, i.e. with SC-OFDM (SC-FDMA).

Overlap-save equalization consists in implementing frequency domain equalization with a "DFT/frequency equalization/IDFT" classical process, on overlapping blocks. Then, a part of the resulting data (located in the center) is kept.

One drawback of overlap-save equalization on a SC-OFDM signal is that it provides degraded performance, even in an AWGN channel. The problem comes from the lack of continuity between consecutive overlapping SC-OFDM symbols. Solution exists by increasing the FFT size.

SUMMARY OF INVENTION

The present invention aims at reducing block discontinuity of a transferred stream using Single-Carrier Frequency Division Multiple Access waveform without increasing the FFT size.

The present invention concerns a method for transferring, by an emitter, a flow of samples to a receiver through a wireless interface using Single-Carrier Frequency Division Multiple Access, characterized in that the method comprises the steps, executed by the emitter, of:
selecting consecutive blocks of M samples of the flow of samples,
modulating each selected block by executing a Discrete Fourier Transform of size M, by adding N-M null subcarriers and by executing an inverse Discrete Fourier Transform of size N,
selecting, for each modulated block, half of the modulated block located in the center of the modulated block in order to form a flow of ordered half modulated blocks,
selecting, with a M/2 sample shift, consecutive blocks of M samples of the flow of samples,
modulating each selected block with the shift by executing a Discrete Fourier Transform of size M, by adding N-M a null subcarriers and by executing an inverse Discrete Fourier Transform of size N,
selecting, for each modulated block with the shift, half of the modulated block with the shift located in the center of the modulated block with the shift in order to form an ordered flow of half modulated blocks with the shift,
forming a stream of samples to be transferred, the formed stream being composed of one in two of one half ordered modulated block and, between two half ordered modulated blocks, one half ordered modulated block with the shift,
transferring the formed stream of samples to the receiver.

The present invention concerns also a device for transferring, by an emitter, a flow of samples to a receiver through a wireless interface using Single-Carrier Frequency Division Multiple Access, characterized in that the device is included in the emitter and comprises:
means for selecting consecutive blocks of M samples of the flow of samples,
means for modulating each selected block by executing a Discrete Fourier Transform of size M, by adding N-M null subcarriers and by executing an inverse Discrete Fourier Transform of size N,
means for selecting, for each modulated block, half of the modulated block located in the center of the modulated block in order to form a flow of ordered half modulated blocks,
means for selecting, with a M/2 sample shift, consecutive blocks of M samples of the flow of samples,
means for modulating each selected block with the shift by executing a Discrete Fourier Transform of size M, by adding N-M a null subcarriers and by executing an inverse Discrete Fourier Transform of size N,
means for selecting, for each modulated block with the shift, half of the modulated block with the shift located in the center of the modulated block with the shift in order to form an ordered flow of half modulated blocks with the shift,
means for forming a stream of samples to be transferred, the formed stream being composed of one in two of one half ordered modulated block and, between two half ordered modulated blocks, one half ordered modulated block with the shift,
means for transferring the formed stream of samples to the receiver.

Thus, the classical discontinuity between SC-OFDM blocks is avoided without increasing the FFT size.

According to a particular feature the flow of samples is composed of data samples to be transferred.

Thus, the out-of-band emission is reduced, in comparison to a classical SC-OFDM signal. Moreover, it will be possible to implement a frequency domain overlap-save equalization in the receiver, which is classically not possible on a SC-OFDM signal due to the discontinuity between SC-OFDM blocks. This overlap-save equalization allows not using a cyclic prefix at the transmitter. The spectral efficiency is then improved with respect to classical SC-OFDM systems.

According to a particular feature, the flow of samples is composed of data samples and pilot samples and the formed stream of samples is composed of half ordered modulated blocks of data, half ordered modulated blocks of data with the shift, half ordered modulated blocks of pilots and half ordered modulated blocks of pilots and data with the shift.

Thus, such a pilot insertion does not degrade the continuity between the half blocks, the spectrum is not modified and data equalization will not be degraded.

According to a particular feature the blocks of pilots consist of a central part $P_1$ of size $M_{P1}$, of a cyclic prefix $P_0$ of size $M_{P0}$ and a cyclic postfix $P_2$ of size $M_{P2}$ with $M_{P0}+M_{P1}+M_{P2}=M$.

Thus, this pilot scheme will allow a simple channel estimation in the receiver, after a FFT of size $M_{P1}$.

According to a particular feature $M_{P0}$ and $M_{P2}$ have the same size.

Thus, the central part of the blocks of pilot is centered, which minimized interference of data on pilots in the receiver.

According to a particular feature blocks of pilots have a pilot rate $R=M_P/M$, that is equal to $15/16$, $7/8$, $3/4$ and $1/2$.

Thus, as a FFT of size $R*N$ is implemented in the receiver, this FFT will only employ radices of size 2, 3, 5, 7, which simplifies the implementation.

According to a particular feature the central parts are Zadoff-chu sequences.

Thus; the PAPR (Peak-to-Average Power Ratio) is minimized in the time domain, while keeping a fixed envelope in the frequency domain. Thus channel estimation in the frequency domain is efficient and time domain signal is more resistant with respect to the non-linearity brought in the transmission.

According to a particular feature the method comprises further steps, executed by the receiver of:
  receiving the formed stream,
  selecting blocks of $R*N$ samples of the formed stream, with R being the pilot rate, each block of $R*N$ samples being composed of $N/2$ samples corresponding to a half ordered modulated block of pilots centered in the centre of the selected block and the remaining samples corresponding to a mix of pilot and data extracted from half ordered modulated blocks with the shift,
  executing, for each selected block of $R*N$ samples of pilots, a Discrete Fourier Transform of size $R*N$,
  selecting of $R*M$ samples from the $R*N$ samples after the Discrete Fourier Transform by ignoring null subcarriers
  executing a channel estimation from selected $R*M$ samples of pilots,
  executing a filtering and an interpolating of the channel estimation in order to obtain M channel estimates
  providing the output of the filtering for an equalizing step.

Thus, the channel is estimated for all subcarriers, with a good robustness with respect to a multipath propagation and a very low interference of data on pilots.

According to a particular feature the method comprises further steps, executed by the receiver of:
  selecting blocks of N samples of the formed stream, each block of N samples being composed of one half ordered modulated block of data centered in the center of the selected block of N samples and two half of two half ordered modulated blocks of data with the shift,
  executing, for each selected block of N samples of data, a Discrete Fourier Transform of size N,
  selecting M transformed samples of data by ignoring null subcarriers,
  equalizing the selected M transformed samples,
  executing an Inverse Discrete Fourier Transform of size M of the equalized selected M transformed samples of data in order to obtain blocks of data in the time domain,
  selecting, for each block of data in the time domain, half of block of data in the time domain located in the center of the block of data in the time domain in order to form an ordered flow of half block of data in the time domain,
  selecting, with a N/2 sample shift, blocks of N samples of the formed stream, each block of N samples with the N/2 shift, being composed of one half ordered modulated block of data with the shift centered in the center of the selected block of N samples and two half of two half ordered modulated blocks of data,
  executing, for each selected block of N samples of data with the shift, a Discrete Fourier Transform of size N,
  selecting M transformed samples of data with the shift by ignoring null subcarriers,
  equalizing the M selected transformed samples of data with the shift,
  executing an Inverse Discrete Fourier Transform of size M of the equalized M selected transformed samples of data with the shift in order to obtain blocks of data in the time domain with shift,
  selecting, for each block of data in the time domain, half of block of data in the time domain with the shift located in the center of the block of data in the time domain with the shift in order to form an ordered flow of half block of data in the time domain with the shift,
  forming a stream of received samples, the stream of received samples being composed of one in two of one half of block of data in the time domain and, between two half ordered modulated blocks, one half of block of data in the time domain with the shift.

Thus, an overlap-save equalization is performed on the signal, with limited interference brought by this process, on the contrary of what would happen with classical SC-OFDM signals. This overlap-save equalization allows avoiding the need of a cyclic prefix. Thus spectral efficiency is increased.

The present invention concerns also a computer program comprising program code instructions which can be loaded in a programmable device for implementing the method according to the first embodiment, when the program code instructions are run by the programmable device.

The present invention also concerns information storage means storing a computer program comprising program code instructions which can be loaded in a programmable device for implementing the method according to the first embodiment, when the program code instructions are run by the programmable device.

BRIEF DESCRIPTION OF THE DRAWINGS

The characteristics of the present invention mentioned above, as well as other characteristics will appear more clearly on reading the following description of an example of an embodiment, said description being done in relation with the joint drawings, among which.

DESCRIPTION OF EMBODIMENT

Figure 1:
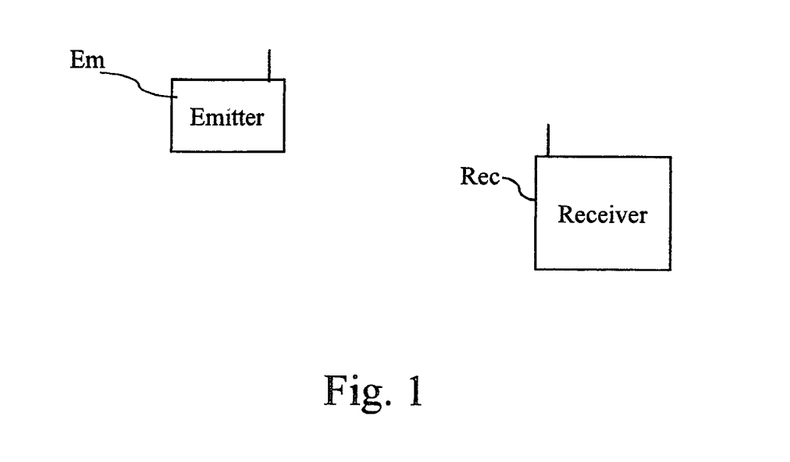
FIG. 1 illustrates schematically an example of a communication system in which the invention may be implemented.

FIG. 1 illustrates schematically an example of a telecommunication system in which the invention can be implemented.

The telecommunication system comprises at least an emitter Em which transmits symbols to at least one receiver Rec.

The telecommunication system may be a wireless telecommunication system using for example Single-Carrier Frequency Division Multiple Access (SC-FDMA) or a broadcasting telecommunication network using for example single-carrier orthogonal frequency division multiplex (SC-OFDM) for its satellite component or may be any communication network with a single-carrier type modulation.

SC-FDMA is a modulation scheme with OFDM-type multiplexing but single-carrier-like envelope. It can be implemented either in the time-domain (IFDMA) or in the frequency-domain. In the last case, it is also called DFT-spread OFDM, or SC-FDE (Single Carrier Frequency Domain Equalisation) or SC-OFDM (Single Carrier Frequency Division Multiple Access).

According to the present invention, the emitter Em:

selects consecutive blocks of M samples of the flow of samples, modulates each selected block by executing a Discrete Fourier Transform of size M, by adding N-M null subcarriers and by executing an inverse Discrete Fourier Transform of size N, selects, for each modulated block, half of the modulated block located in the center of the modulated block in order to form a flow of ordered half modulated blocks, selects, with a M/2 sample shift, consecutive blocks of M samples of the flow of samples, modulates each selected block with the shift by executing a Discrete Fourier Transform of size M, by adding N-M a null subcarriers and by executing an inverse Discrete Fourier Transform of size N, selects, for each modulated block with the shift, half of the modulated block with the shift located in the center of the modulated block with the shift in order to form an ordered flow of half modulated blocks with the shift, forms a stream of samples to be transferred, the formed stream being composed of one in two of one half ordered modulated block and, between two half ordered modulated blocks, one half ordered modulated block with the shift, transfers the formed stream of samples to the receiver.

The receiver Rec:

selects blocks of N samples of the formed stream, each block of N samples being composed of one half ordered modulated block of data centered in the center of the selected block of N samples and two half of two half ordered modulated blocks of data with the shift, executes, for each selected block of N samples of data, a Discrete Fourier Transform of size N, selects M transformed samples of data by ignoring null subcarriers, equalizes the selected M transformed samples, executes an Inverse Discrete Fourier Transform of size M of the equalized selected M transformed samples of data in order to obtain blocks of data in the time domain, selects, for each block of data in the time domain, half of block of data in the time domain located in the center of the block of data in the time domain in order to form an ordered flow of half block of data in the time domain, selects, with a N/2 sample shift, blocks of N samples of the formed stream, each block of N samples with the N/2 shift, being composed of one half ordered modulated block of data with the shift centered in the center of the selected block of N samples and two half of two half ordered modulated blocks of data, executes, for each selected block of N samples of data with the shift, a Discrete Fourier Transform of size N, selects M transformed samples of data with the shift by ignoring null subcarriers, equalizes the M selected transformed samples of data with the shift, executes an Inverse Discrete Fourier Transform of size M of the equalized M selected transformed samples of data with the shift in order to obtain blocks of data in the time domain with shift, selects, for each block of data in the time domain, half of block of data in the time domain with the shift located in the center of the block of data in the time domain with the shift in order to form an ordered flow of half block of data in the time domain with the shift, forms a stream of received samples, the stream of received samples being composed of one in two of one half of block of data in the time domain and, between two half ordered modulated blocks, one half of block of data in the time domain with the shift.

Figure 2:
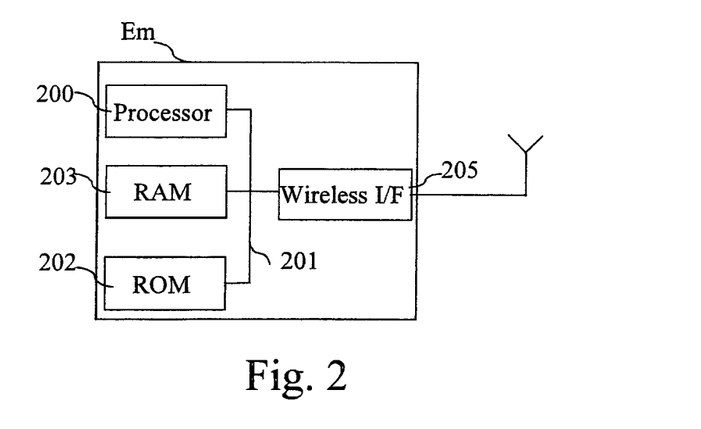
FIG. 2 illustrates schematically an example of an emitter in which the present invention may be implemented.

FIG. 2 illustrates schematically an example of an emitter in which the present invention may be implemented.

According to the shown architecture, the emitter Em comprises the following components interconnected by a communication bus 201: a processor, microprocessor, microcontroller or CPU (Central Processing Unit) 200; a RAM (Random-Access Memory) 203; a ROM (Read-Only Memory) 202 and a wireless interface 205 connected to at least one antenna.

The wireless interface 205 allows the emitter Em to transmit symbols.

Figure 8:
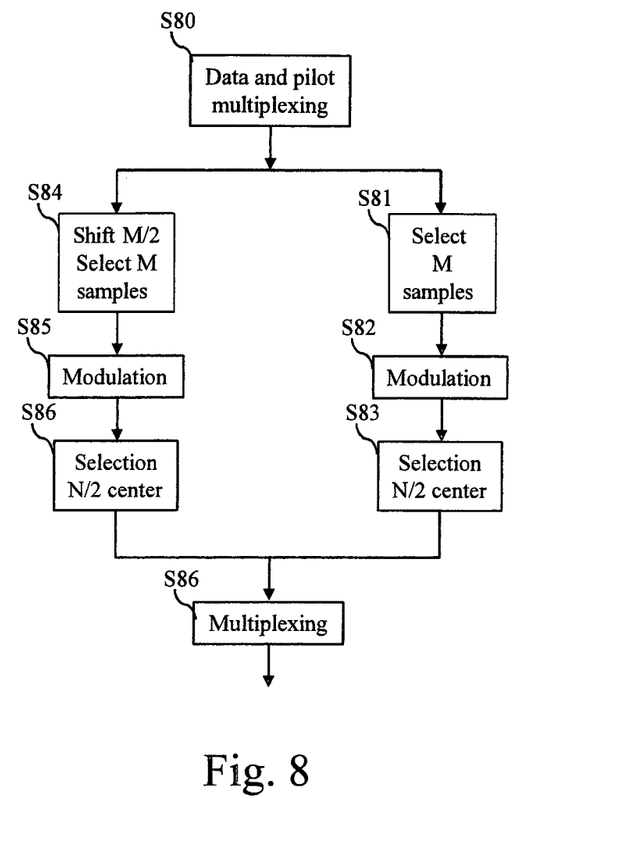
FIG. 8 represents an example of an algorithm executed by the emitter in which the present invention may be implemented.

CPU 200 is capable of executing instructions as disclosed in reference to FIG. 8 loaded into RAM 203 from ROM 202 or from an external memory. After the emitter Em is powered on, CPU 200 is capable of reading instructions from RAM 203 and executing these instructions. The instructions as disclosed in reference to FIG. 8 form one computer program that causes CPU 200 to process data according to the present invention.

The algorithm as disclosed in reference to FIG. 8 may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

Figure 3:
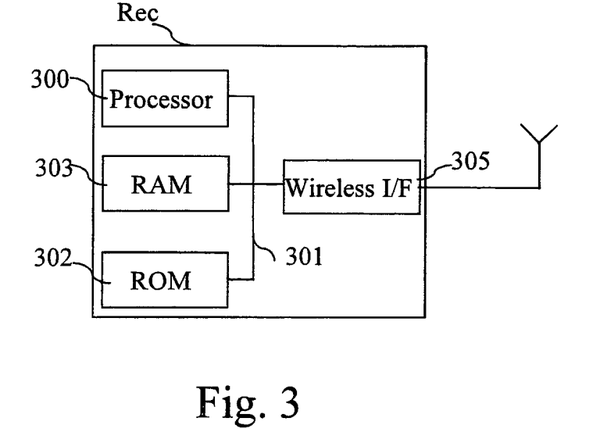
FIG. 3 illustrates schematically an example of a receiver in which the present invention may be implemented.

FIG. 3 illustrates schematically an example of a receiver in which the present invention may be implemented.

According to the shown architecture, the receiver Rec comprises the following components interconnected by a communication bus 301: a processor, microprocessor, microcontroller or CPU (Central Processing Unit) 200; a RAM (Random-Access Memory) 303; a ROM (Read-Only Memory) 302 and a wireless interface 305 connected to at least one antenna.

The wireless interface 305 allows the receiver Rec to receive symbols.

Figure 9:
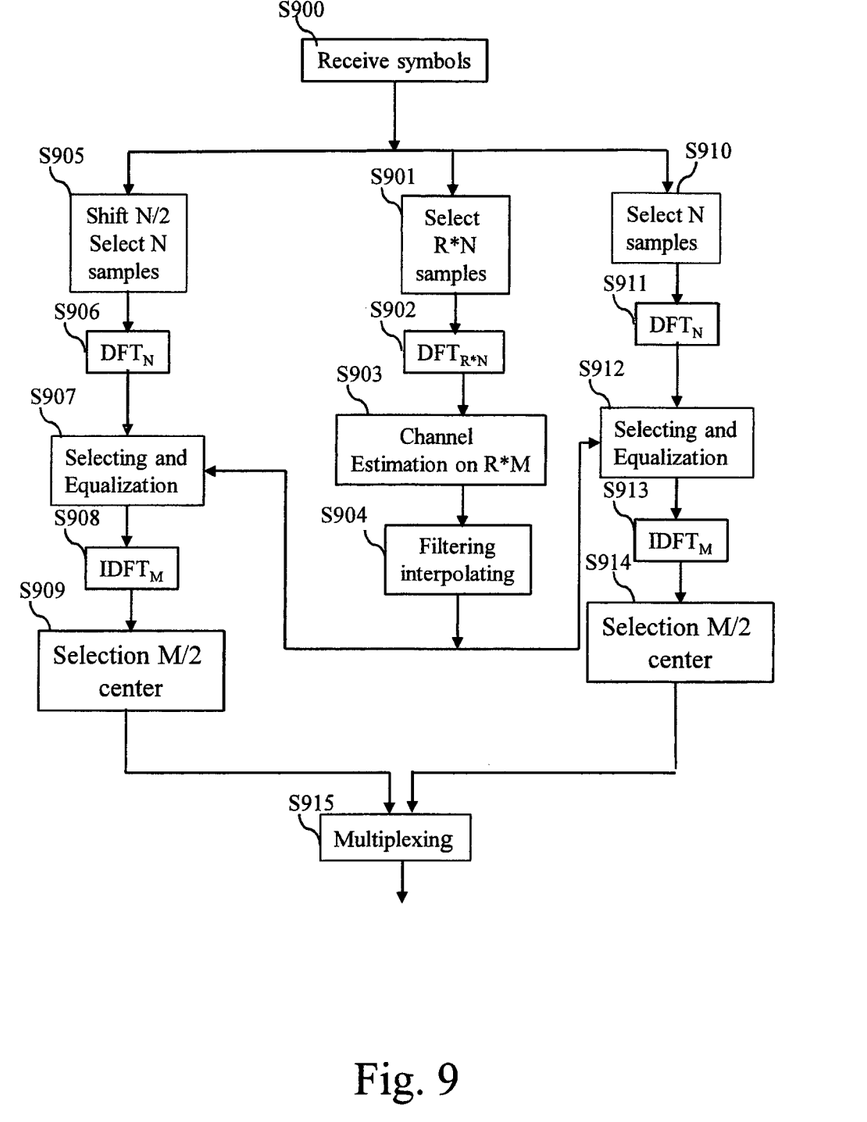
FIG. 9 represents an example of an algorithm executed by the receiver in which the present invention may be implemented.

CPU 300 is capable of executing instructions as disclosed in reference to FIG. 9 loaded into RAM 303 from ROM 302 or from an external memory. After the emitter Em is powered on, CPU 300 is capable of reading instructions from RAM 303 and executing these instructions. The instructions as disclosed in reference to FIG. 9 form one computer program that causes CPU 300 to decode received symbols according to the present invention.

The algorithm as disclosed in reference to FIG. 9 may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

Figure 4:
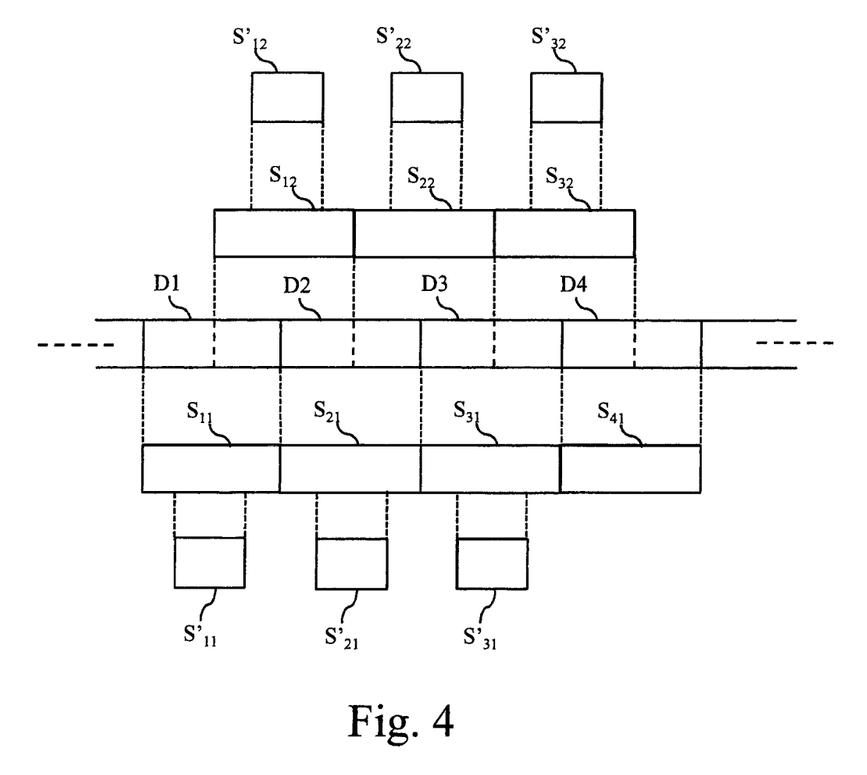
FIG. 4 is an example of the symbol overlapping process performed by the emitter according to the present invention.

FIG. 4 is an example of the symbol overlapping process performed by the emitter according to the present invention.

In the example of FIG. 4, data and pilot to be transmitted by the emitter are selected in consecutive blocks of M samples. Only four data blocks of data samples D1 to D4 among the flow of consecutive blocks of data samples are shown in FIG. 4.

The selected block of data samples D1 is modulated in order to form a modulated block noted $S_{11}$.

The modulation consists, for example, of a spreading under the form of a DFT of size M, N-M null subcarriers adding and an IDFT of size N.

The selected block of data samples D2 is modulated in order to form a modulated block noted $S_{21}$, the selected block of data samples D3 is modulated in order to form a modulated block noted $S_{31}$ and the selected block of data samples D4 is modulated in order to form a modulated block noted $S_{41}$.

Thanks to a M/2 selection shift, a second half of the block of data samples D1 and a first half of the block of data samples D2 are selected and modulated in order to form a modulated block with the shift noted $S_{12}$. A second half of the block of data samples D2 and a first half of the block of data samples D3 are modulated in order to form a modulated block with the shift noted $S_{22}$ and a second half of the block of data samples D3 and a first half of the block of data samples D4 are modulated in order to form a modulated block with the shift noted $S_{32}$.

Half of the modulated block $S_{11}$ located in the center of modulated block $S_{11}$ is selected in order to form a half modulated block $S'_{11}$. Half of the modulated block $S_{21}$ located in the center of modulated block $S_{21}$ is selected in order to form a half modulated block $S'_{21}$. Half of the modulated block $S_{31}$ located in the center of modulated block $S_{31}$ is selected in order to form a half modulated block $S'_{31}$.

Half of the modulated block with the M/2 shift $S_{12}$ located in the center of modulated block with the M/2 shift $S_{12}$ is selected in order to form a half modulated block with the M/2 shift $S'_{12}$. Half of the modulated block with the M/2 shift $S_{22}$ located in the center of modulated block with the M/2 shift $S_{22}$ is selected in order to form a half modulated block with the M/2 shift $S'_{22}$. Half of the modulated block with the M/2 shift $S_{32}$ located in the center of modulated block with the M/2 shift $S_{32}$ is selected in order to form a half modulated block with the M/2 shift $S'_{32}$.

The half modulated blocks are multiplexed in order to form a continuous stream of samples $S'_{11}$, $S'_{12}$, $S'_{21}$, $S'_{22}$, $S'_{31}$, $S'_{32}$ and so on of blocks to be transferred to the receiver Rec.

The formed stream is composed of one in two half ordered modulated blocks and, between two half ordered modulated blocks, one half ordered modulated block with the shift.

Figure 5:
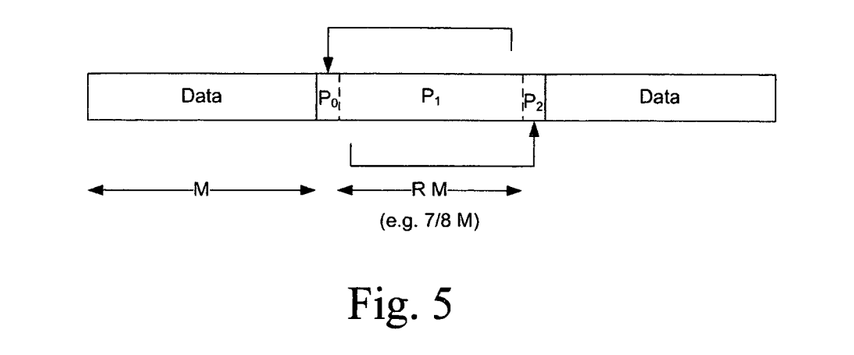
FIG. 5 is an example of the pilot symbol insertion performed by the emitter according to the present invention.

FIG. 5 is an example of the pilot symbol insertion performed by the emitter according to the present invention.

The pilot symbol inserting consists in multiplexing with blocks of data samples a block of pilot samples of size M, prior to modulation. The block of pilot samples P consists of a central part $P_1$ of size $M_{P1}$, of a cyclic prefix $P_0$ of size $M_{P0}$ and a cyclic postfix $P_2$ of size $M_{P2}$ with $M_{P0}+M_{P1}+M_{P2}=M$.

It has to be noted here that $M_{P0}$ and $M_{P2}$ may be equal. $M_{P1}$ is selected in the following range: $M/2 \leq M_{P1} < M$.

If we denote the pilot rate $R=M_{P1}/M$, this corresponds to $½ \leq R < 1$. In the receiver, DFT size of rate R*N has to be implemented.

Preferably, the present invention uses a pilot rate that is equal to 15/16, 7/8, 3/4, 1/2.

As usual, the cyclic prefix, respectively the cyclic postfix, is obtained by copying the last $M_{P1}$ (resp. first $M_{P2}$) samples of the part $P_1$.

If the pilot rate is equal to ½, the present invention provides at the emitter blocks of size N/2 located at the center of blocks of size N. In the receiver, a FFT of size N/2 is performed, which provides a channel estimate on one subcarrier over two. Then, a simple oversampling of ratio two is implemented, to get a channel estimates on all subcarriers.

The scheme is rather simple to implement and has the advantage that about all the interference brought by the adjacent data blocks is removed. However, it has the drawback that half of the sent pilot power is lost. Therefore, 3 dB are lost for the final signal over noise ratio on the channel estimates.

On the other hand, for a rate of ⅞, the loss is equal to 0.58 dB only. The interference due to the adjacent data blocks is higher than in the previous solution. However, the difference is very small, as the interference is mainly located near the edges. In this case, an oversampling of 8/7 has to be performed at receiver side.

The $P_1$ part may have a uniform or almost uniform level in both time and frequency. For that purpose, a classical Zadoff-Chu sequence could be adopted.

Figure 6:
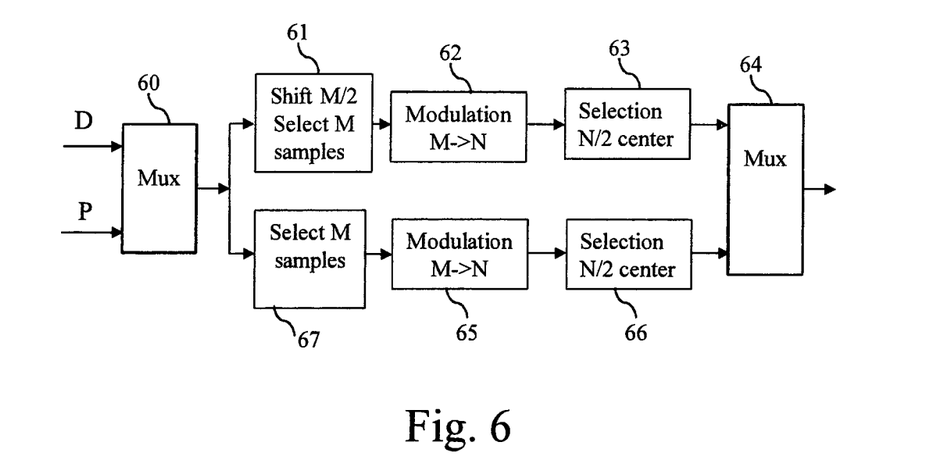
FIG. 6 represents an example of a hardware architecture of a wireless interface of the emitter in which the present invention may be implemented.

FIG. 6 represents an example of a hardware architecture of a wireless interface of the emitter in which the present invention may be implemented.

The wireless interface 205 comprises a multiplexer 60 that multiplexes pilot samples P and data samples to be transmitted.

The output of the multiplexer 60 is provided to a selection module 61 and to a selection module 67.

The selection module 67 selects consecutive blocks of M samples of the flow of samples as D1, D2, D3 and D4 in FIG. 4.

The output of the selection module 67 is provided to a modulation module 65.

The modulation module 65 modulates each selected block by executing a Discrete Fourier Transform of size M, by adding N-M null subcarriers and by executing an inverse Discrete Fourier Transform of size N.

The output of the modulation module 65, like $S_{11}, S_{21}, S_{31}$ and $S_{41}$ in FIG. 4 is provided to a selection module 66.

The selection module 66 selects, for each modulated block, half of the modulated block located in the center of the modulated block in order to form a flow of ordered half modulated blocks as $S'_{11}, S'_{21}$ and $S'_{31}$ in FIG. 4.

The output of the selection module 66 is provided to a multiplexer 64.

The selection module 61 selects, with a M/2 sample shift, consecutive blocks of M samples of the flow of samples, as the second part of D1 and the first part of D2, the second part of D2 and the first part of D3, the second part of D3 and the first part of D4 in FIG. 4.

The output of the selection module 61 is provided to the modulation module 62.

The modulation module 62 modulates each selected block with the shift by executing a Discrete Fourier Transform of size M, by adding N-M null subcarriers and by executing an inverse Discrete Fourier Transform of size N.

The output of the modulation module, like $S_{12}, S_{22}$ and $S_{32}$ in FIG. 4 is provided to a selection module 63.

The selection module 63 selects, for each modulated block with the shift, half of the modulated block with the shift located in the center of the modulated block with the shift in order to form an ordered flow of half modulated blocks with the shift like $S'_{12}, S'_{22}$ and $S'_{32}$ in FIG. 4.

The output of the selection module 63 is provided to the multiplexer 64.

The multiplexer 64 forms a stream of samples to be transferred to the receiver Rec, the formed stream is composed of one in two of one half ordered modulated block and, between two half ordered modulated blocks, one half ordered modulated block with the shift like $S'_{11}, S'_{12}, S'_{21}, S'_{22}, S'_{31}, S'_{32}$ and so on in the example of FIG. 4.

Figure 7:
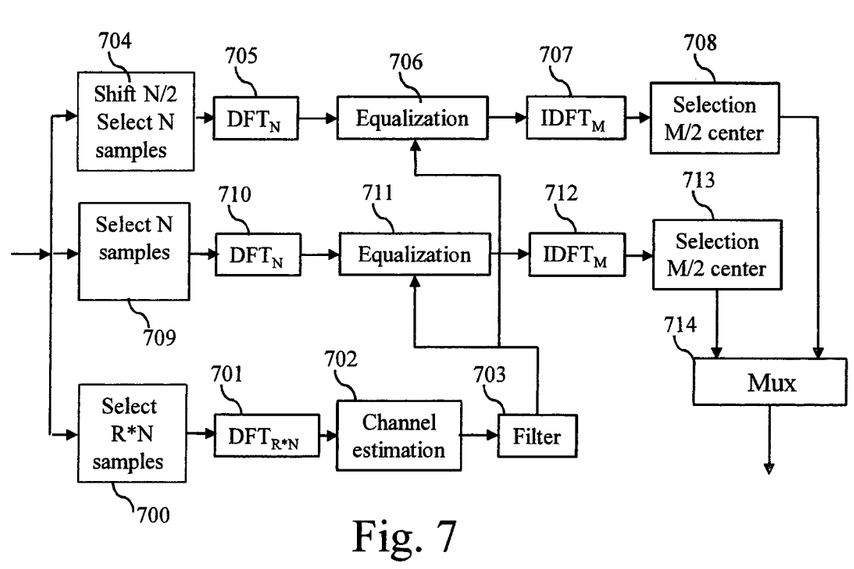
FIG. 7 represents an example of a hardware architecture of a wireless interface of the receiver in which the present invention may be implemented.

FIG. 7 represents an example of a hardware architecture of a wireless interface of the receiver in which the present invention may be implemented.

The wireless interface 305 receives a continuous stream of samples $S'_{11}, S'_{12}, S'_{21}, S'_{22}, S'_{31}, S'_{32}$ and so from the emitter Em that are transferred to selection modules 700, 704 and 709.

The selection module 700 selects blocks of R*N samples of the formed stream, where R is the pilot rate. Each block of R*N samples is composed of N/2 samples corresponding to a half ordered modulated block of pilots centered in the center of the selected block and the remaining samples corresponding to a mix of pilot and data extracted from half ordered modulated blocks with the shift.

The output of the selection module 700 is provided to a DFT module 701.

The DFT module 701 executes, for each selected block of R*N samples of pilots, a Discrete Fourier Transform of size R*N.

The output of the DFT module 701 is provided to a channel estimation module 702.

The channel estimation module 702 selects R*M samples from the R*N samples after the Discrete Fourier Transform by ignoring null subcarriers and executes a channel estimation from selected R*M samples of pilots.

The channel estimation module 702 performs a channel estimation on the transformed modulated received blocks of pilots by dividing the transformed modulated received blocks by corresponding pilot blocks used by the emitter.

The output of the channel estimation module is provided to a filter 703. The filter 703 is a smoothing/interpolation filter. For example, the filter 703 is a FIR filter, with different coefficients sets depending of the index of the frequency response to be estimated. For example, for a ratio R=⅞, and neglecting the side effects here, 8 sets of coefficients could be used. The interpolation ratio is equal to $R^{-1}$.

Concerning the calculation of these coefficients, a MMSE filter, like a Wiener filter may be used. Generally, these calculations are performed off-line and the results are stored in memory. Several such sets can be memorized, for different average signal-to-noise ratios.

The output of the filter 703 is provided to equalization modules 706 and 711.

The selection module 709 selects blocks of N samples of the formed stream. Each block of N samples is composed of one half ordered modulated block of data centered in the center of the selected block of N samples and two half of two half ordered modulated blocks of data with the shift.

The output of the selection module 709 is provided to a DFT module 710.

The DFT module 710 executes, for each selected block of N samples of data, a Discrete Fourier Transform of size N.

The output of the DFT module 710 is provided to an equalization module 711.

The equalization module 711 selects M transformed samples of data by ignoring null subcarriers and equalizes the selected M transformed samples. For example, the equalization is a MMSE (Minimum Mean Square Error) equalization performed subcarrier per subcarrier.

The output of the equalization module 711 is provided to an IDFT module 712.

The IDFT module 712 executes an Inverse Discrete Fourier Transform of size M of the equalized selected M transformed samples of data in order to obtain blocks of data in the time domain.

The output of the IDFT module 712 is provided to a selection module 713.

The selection module 713 selects, for each block of data in the time domain, half of block of data in the time domain located in the center of the block of data in the time domain in order to form an ordered flow of half block of data in the time domain.

The output of the selection module 713 is provided to a multiplexer 714.

The selection module 704 selects, with a N/2 sample shift, blocks of N samples of the formed stream, each block of N samples with the N/2 shift, is composed of one half ordered modulated block of data with the shift centered in the centre of the selected block of N samples and two half of two half ordered modulated blocks of data.

The output of the selection module 704 is provided to a DFT module 705.

The DFT module 705 executes, for each selected block of N samples of data with the shift, a Discrete Fourier Transform of size N.

The output of the DFT module 705 is provided to an equalization module 706.

The equalization module 706 selects M transformed samples of data with the shift by ignoring null subcarriers and equalizes the M selected transformed samples of data with the shift.

The output of the equalization module is provided to an IDFT module 707.

The IDFT module 707 executes an Inverse Discrete Fourier Transform of size M of the equalized M selected transformed samples of data with the shift in order to obtain blocks of data in the time domain with the shift.

The output of the IDFT module 707 is provided to a selection module 708.

The selection module 708 selects, for each block of data in the time domain, half of block of data in the time domain with the shift located in the center of the block of data in the time domain with the shift in order to form an ordered flow of half block of data in the time domain with the shift.

The output of the selection module 708 is provided to the multiplexer 714.

The multiplexer 714 forms a stream of received samples, the stream of received samples is composed of one in two half of blocks of data in the time domain and, between two half ordered modulated blocks, one half of block of data in the time domain with the shift.

FIG. 8 represents an example of an algorithm executed by the emitter in which the present invention may be implemented.

The present algorithm is disclosed in an example wherein it is executed by the processor 200 of the emitter Em.

At step S80, the processor 200 multiplexes pilot samples P and data samples to be transmitted.

The output of the multiplexing step S80 is provided to selection steps S81 and S84.

At step S81, the processor 200 selects consecutive blocks of M samples of the flow of samples as D1, D2, D3 and D4 in FIG. 4.

The output of the selection step S81 is provided to a modulation step S82.

At step S82, the processor 200 modulates each selected block by executing a Discrete Fourier Transform of size M, by adding N-M null subcarriers and by executing an inverse Discrete Fourier Transform of size N.

The output of the modulation step S82, like $S_{11}$, $S_{21}$, $S_{31}$ and $S_{41}$ in FIG. 4 is provided to a selection step S83.

At step S83, the processor 200 selects, for each modulated block, half of the modulated block located in the center of the modulated block in order to form a flow of ordered half modulated blocks as $S'_{11}$, $S'_{21}$ and $S'_{31}$ in FIG. 4.

The output of the selection step S83 is provided to a multiplexer step S86.

At step S84, the processor 200 selects, with a M/2 sample shift, consecutive blocks of M samples of the flow of samples, as the second part of D1 and the first part of D2, the second part of D2 and the first part of D3, the second part of D3 and the first part of D4 in FIG. 4.

The output of the selection step S84 is provided to a modulation step S85.

At step S85, the processor 200 modulates each selected block with the shift by executing a Discrete Fourier Transform of size M, by adding N-M null subcarriers and by executing an inverse Discrete Fourier Transform of size N.

The output of the modulation step S85, like $S_{12}$, $S_{22}$ and $S_{31}$ in FIG. 4 is provided to a selection step S86.

At step S86, the processor 200 selects, for each modulated block with the shift, half of the modulated block with the shift located in the center of the modulated block with the shift in order to form an ordered flow of half modulated blocks with the shift like $S'_{12}$, $S'_{22}$ and $S'_{32}$ in FIG. 4.

The output of the selection step S86 is provided to the multiplexing step S86.

At step S86, the processor 200 forms a stream of samples to be transferred to the receiver Rec, the formed stream is composed of one in two of one half ordered modulated block and, between two half ordered modulated, blocks, one half ordered modulated block with the shift like $S'_{11}$, $S'_{12}$, $S'_{21}$, $S'_{31}$, $S'_{32}$ and so on in the example of FIG. 4.

FIG. 9 represents an example of an algorithm executed by the receiver in which the present invention may be implemented.

The present algorithm is disclosed in an example wherein it is executed by the processor 300 of the receiver Rec.

At step S900, the processor 300 detects the reception, by the wireless interface 305, of a continuous stream of samples $S'_{11}$, $S'_{12}$, $S'_{22}$, $S'_{31}$, $S'_{32}$ and so from the emitter Em that are transferred to selection steps S901, S905 and S910.

At step S901, the processor 300 selects blocks of R*N samples of the formed stream, where R is the pilot rate. Each block of R*N samples is composed of N/2 samples corresponding to a half ordered modulated block of pilots centered in the center of the selected block and the remaining samples corresponding to a mix of pilot and data extracted from half ordered modulated blocks with the shift.

The output of the selection step S901 is provided to a DFT step S902.

At step S902, the processor 300 executes, for each selected block of R*N samples of pilots, a Discrete Fourier Transform of size R*N.

The output of the DFT step S902 is provided to a channel estimation step S903.

At step S903, the processor 300 selects R*M samples from the R*N samples after the Discrete Fourier Transform by ignoring null subcarriers and executes a channel estimation from selected R*M samples of pilots.

The processor 300 performs a channel estimation on the transformed modulated received blocks of pilots by dividing the transformed modulated received blocks by corresponding pilot blocks used by the emitter. The output of the channel estimation step S903 is provided to a filtering step S904.

At step S904, the processor 300 executes a smoothing/interpolation filtering. For example, the filter 703 is a FIR filter, with different coefficients sets depending of the index of the frequency response to be estimated. For example, for a ratio R=⅞, and neglecting the side effects here, 8 sets of coefficients could be used. The interpolation ratio is equal to $R^{-1}$.

Concerning the calculation of these coefficients, a MMSE filter, like a Wiener filter may be used. Generally, these calculations are performed off-line and the results are stored in memory. Several such sets can be memorized for different average signal-to-noise ratios.

The output of the filtering step S904 is provided to equalization steps S907 and S911.

At step S910, the processor 300 selects blocks of N samples of the formed stream. Each block of N samples is composed of one half ordered modulated block of data centered in the center of the selected block of N samples and two half of two half ordered modulated blocks of data with the shift.

The output of the selection step S910 is provided to a DFT step S911.

At step S911, the processor 300 executes, for each selected block of N samples of data, a Discrete Fourier Transform of size N.

The output of the DFT step S911 is provided to an equalization step S912.

At step S912, the processor 300 selects M transformed samples of data by ignoring null subcarriers and equalizes the selected M transformed samples. For example, the equalization is a MMSE equalization performed subcarrier per subcarrier.

The output of the equalization step S912 is provided to an IDFT step S913.

At step S913, the processor 300 executes an Inverse Discrete Fourier Transform of size M of the equalized selected M transformed samples of data in order to obtain blocks of data in the time domain.

The output of the IDFT step is provided to a selection step S914.

At step S914, the processor 300 selects, for each block of data in the time domain, half of block of data in the time domain located in the center of the block of data in the time domain in order to form an ordered flow of half block of data in the time domain.

The output of the selection step S914 is provided to a multiplexing step S915.

At step S915, the processor 300 selects, with a N/2 sample shift, blocks of N samples of the formed stream, each block of N samples with the N/2 shift, is composed of one half ordered modulated block of data with the shift centered in the center of the selected block of N samples and two half of two half ordered modulated blocks of data.

The output of the selection step is provided to a DFT step S906.

At step S906, the processor 300 executes, for each selected block of N samples of data with the shift, a Discrete Fourier Transform of size N.

The output of the DFT step S906 is provided to an equalization step S907.

At step S907, the processor 300 selects M transformed samples of data with the shift by ignoring null subcarriers and equalizes the M selected transformed samples of data with the shift. For example, the equalization is a MMSE equalization performed subcarrier per subcarrier.

The output of the equalization step is provided to an IDFT step S908.

At step S908, the processor 300 executes an Inverse Discrete Fourier Transform of size M of the equalized M selected transformed samples of data with the shift in order to obtain blocks of data in the time domain with the shift.

The output of the TUFT step S908 is provided to a selection step S909.

At step S909, the processor 300 selects, for each block of data in the time domain, half of block of data in the time domain with the shift located in the center of the block of data in the time domain with the shift in order to form an ordered flow of half block of data in the time domain with the shift.

The output of the selection step S909 is provided to the multiplexing step S915.

At step S915, the processor 300 forms a stream of received samples, the stream of received samples is composed of one in two half of blocks of data in the time domain and, between two half ordered modulated blocks, one half of block of data in the time domain with the shift.

The invention claimed is:

1. A method for transferring, by an emitter, a flow of samples to a receiver through a wireless interface using Single-Carrier Frequency Division Multiple Access comprising, by the emitter:
   selecting consecutive blocks of M samples of the flow of samples;
   modulating each selected block by executing a Discrete Fourier Transform of size M, by adding N-M null subcarriers and by executing an inverse Discrete Fourier Transform of size N;
   selecting, for each modulated block, half of the modulated block located in a center of the modulated block in order to form a flow of ordered half modulated blocks;
   selecting, with a M/2 sample shift, consecutive blocks of M samples of the flow of samples;
   modulating each selected block with the shift, by executing the Discrete Fourier Transform of size M, by adding N-M null subcarriers and by executing the inverse Discrete Fourier Transform of size N;
   selecting, for each modulated block with the shift, half of the modulated block with the shift located in a center of the modulated block with the shift in order to form a flow of half ordered modulated blocks with the shift;
   forming a stream of samples to be transferred, the formed stream being composed of one in two half ordered modulated blocks and, between the two half ordered modulated blocks, one half ordered modulated block with the shift; and
   transferring the formed stream of samples to the receiver.

2. The method according to claim 1, wherein the flow of samples is composed of data samples to be transferred.

3. The method according to claim 1, wherein the flow of samples is composed of data samples and pilots, and the formed stream of samples is composed of half ordered modulated blocks of data, half ordered modulated blocks of data with the shift, half ordered modulated blocks of pilots and half ordered modulated blocks of pilots with the shift.

4. The method according to claim 3, wherein the blocks of pilots consist of a central part $P_1$ of size $M_{P1}$, a cyclic prefix $P_0$ of size $M_{P0}$ and a cyclic postfix $P_2$ of size $M_{P2}$ where a sum of the sizes $M_{P0}$, $M_{P1}$ and $M_{P2}$ is equal to the size M.

5. The method according to claim 4, wherein $M_{P0}$ and $M_{P2}$ have the same size.

6. The method according to claim 5, wherein blocks of pilots have a pilot rate R obtained by dividing the size $M_{p1}$ by the size M, the pilot rate being equal to 15/16, 7/8, 3/4 or 1/2.

7. The method according to claim 4, wherein the central parts are Zadoff-chu sequences.

8. The method according to claim 4 further comprising, by the receiver:
   receiving the formed stream;
   selecting blocks of R*N samples of pilots of the formed stream, with R being a pilot rate, each block of R*N samples of pilots being composed of N/2 samples corresponding to a half ordered modulated block of pilots located in a center of the selected block and remaining samples corresponding to a mix of pilot and data extracted from half ordered modulated blocks of pilots with the shift;
   executing, for each selected block of R*N samples of pilots, a Discrete Fourier Transform of size R*N;
   selecting R*M samples of pilots from the blocks of R*N samples of pilots after the Discrete Fourier Transform by ignoring null subcarriers;
   executing a channel estimation from the selected R*M samples of pilots;
   executing a filtering and an interpolating for the channel estimation in order to obtain M channel estimates; and
   providing an output of the filtering for an equalizing step.

9. The method according to claim 1 further comprising, by the receiver:
   selecting blocks of N samples of data of the formed stream, each block of N samples of data being composed of one half ordered modulated block of data located in a center of the selected block of N samples of data and two half ordered modulated blocks of data with the shift;

executing, for each selected block of N samples of data, a Discrete Fourier Transform of size N;

selecting M transformed samples of data from the blocks of N samples of data by ignoring null subcarriers;

equalizing the selected M transformed samples of data;

executing an Inverse Discrete Fourier Transform of size M for the equalized selected M transformed samples of data in order to obtain blocks of data in a time domain;

selecting, for each block of data in the time domain, half of the block of data in the time domain located in a center of the block of data in the time domain in order to form a flow of half ordered blocks of data in the time domain;

selecting, with a N/2 sample shift, blocks of N samples of data of the formed stream, each block of N samples of data with the N/2 shift being composed of one half ordered block of data with the shift located in a center of the selected block of N samples of data and two half ordered blocks of data;

executing, for each selected block of N samples of data with the N/2 shift, the Discrete Fourier Transform of size N;

selecting M transformed samples of data with the N/2 shift from the blocks of N samples of data with the N/2 shift by ignoring null subcarriers;

equalizing the M selected transformed samples of data with the N/2 shift;

executing the Inverse Discrete Fourier Transform of size M for the equalized M selected transformed samples of data with the N/2 shift in order to obtain blocks of data in the time domain with the N/2 shift;

selecting, for each block of data in the time domain with the N/2 shift, half of the block of data in the time domain with the N/2 shift located in a center of the block of data in the time domain with the N/2 shift in order to form a flow of half ordered blocks of data in the time domain with the N/2 shift; and forming a stream of received samples, the stream of received samples being composed of one in two half ordered blocks of data in the time domain and, between the two half ordered modulated blocks of data in the time domain, one half ordered block of data in the time domain with the N/2 shift.

10. A non-transitory computer readable storage medium comprising program code instructions which can be loaded in a programmable device for implementing the method according to claim 1, when the program code instructions are executed by the programmable device.

11. A device for transferring, by an emitter, a flow of samples to a receiver through a wireless interface using Single-Carrier Frequency Division Multiple Access, included in the emitter, the device comprising a processor configured to:

select consecutive blocks of M samples of the flow of samples;

modulate each selected block by executing a Discrete Fourier Transform of size M, by adding N-M null subcarriers and by executing an inverse Discrete Fourier Transform of size N;

select, for each modulated block, half of the modulated block located in a center of the modulated block in order to form a flow of ordered half modulated blocks;

select, with a M/2 sample shift, consecutive blocks of M samples of the flow of samples;

modulate each selected block with the shift, by executing the Discrete Fourier Transform of size M, by adding N-M null subcarriers and by executing the inverse Discrete Fourier Transform of size N;

select, for each modulated block with the shift, half of the modulated block with the shift located in a center of the modulated block with the shift in order to form a flow of half ordered blocks with the shift;

form a stream of samples to be transferred, the formed stream being composed of one in two half ordered modulated blocks and, between the two half ordered modulated blocks, one half ordered modulated block with the shift; and transfer the formed stream of samples to the receiver.

* * * * *